United States Patent
Hosoda

(10) Patent No.: US 11,503,185 B2
(45) Date of Patent: Nov. 15, 2022

(54) IMAGE FORMING APPARATUS FOR AUTOMATIC REGISTRATION OF USERS USING AN IC CARD TO LOGIN

(71) Applicant: Canon Kabushiki Kaisha, Tokyo (JP)

(72) Inventor: Yasuhiro Hosoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/337,842

(22) Filed: Jun. 3, 2021

(65) Prior Publication Data
US 2021/0385355 A1 Dec. 9, 2021

(30) Foreign Application Priority Data

Jun. 4, 2020 (JP) .............................. JP2020-097834

(51) Int. Cl.
| | | |
|---|---|---|
| *H04N 1/00* | (2006.01) | |
| *H04N 1/44* | (2006.01) | |
| *G06K 7/00* | (2006.01) | |

(52) U.S. Cl.
CPC ......... *H04N 1/4426* (2013.01); *G06K 7/0013* (2013.01); *H04N 1/00413* (2013.01); *H04N 1/00474* (2013.01); *H04N 1/00514* (2013.01); *H04N 1/4433* (2013.01); *H04N 2201/0094* (2013.01)

(58) Field of Classification Search
CPC ............. H04N 1/4426; H04N 1/00413; H04N 1/00514; H04N 1/4433
See application file for complete search history.

(56) References Cited

U.S. PATENT DOCUMENTS

| | | | | |
|---|---|---|---|---|
| 2009/0006652 | A1* | 1/2009 | Kasatani ............ | H04N 1/00204 709/248 |
| 2012/0099136 | A1* | 4/2012 | Ueda .................. | H04N 1/00339 358/1.14 |
| 2012/0198548 | A1* | 8/2012 | Chen ...................... | H04L 9/0869 726/19 |
| 2014/0320887 | A1* | 10/2014 | Sugiyama ............ | H04N 1/4433 358/1.14 |
| 2017/0013152 | A1* | 1/2017 | Morii .................. | H04N 1/00509 |
| 2018/0107438 | A1* | 4/2018 | Takeuchi ............ | H04L 63/0853 |
| 2018/0234585 | A1* | 8/2018 | Yano ........................ | G06F 21/34 |
| 2018/0300463 | A1* | 10/2018 | Takeo .................... | G06F 3/1238 |
| 2019/0004752 | A1* | 1/2019 | Yamada ................ | G06F 3/1267 |
| 2019/0258427 | A1* | 8/2019 | Hosoda .................. | G06Q 40/12 |
| 2020/0137243 | A1* | 4/2020 | Okada ................ | H04N 1/00474 |

FOREIGN PATENT DOCUMENTS

JP 2017113451 A 6/2017

* cited by examiner

*Primary Examiner* — Benjamin O Dulaney
(74) *Attorney, Agent, or Firm* — Venable LLP

(57) ABSTRACT

An image forming apparatus comprising a display and a reader that reads an IC card. The image forming apparatus performs settings for user authentication and displays on the display a menu screen for selecting a function of the image forming apparatus. In a case where in user authentication by the IC card and automatic registration of user information are set in the settings, a user of an IC card is able to log in the image forming apparatus using information of the IC card when the reader detects the IC card of the user.

10 Claims, 13 Drawing Sheets

FIG. 4

USER AUTHENTICATION SETTINGS

LOCAL UI LOGIN SETTING

○ NO AUTHENTICATION
● IC CARD AUTHENTICATION
○ FACE AUTHENTICATION

FACE AUTHENTICATION SCORE (1 TO 100)  [ 80 ] — 402

⎱ 401

USER INFORMATION REGISTRATION

☑ AUTOMATIC USER REGISTRATION
  ☐ DISPLAY REGISTRATION SCREEN AT TIME OF INITIAL LOGIN

⎱ 403

USER INFORMATION DELETION

☑ AUTOMATIC USER DELETION
   PERIOD (1 DAY TO 90 DAYS)  [ 30 ]

⎱ 404

[REGISTER] [EDIT] [DELETE]

405

| | CARD ID/Face ID | ROLE | USER NAME | EMAIL |
|---|---|---|---|---|
| ☐ | | ADMINISTRATOR | Administrator | admin@abc.com |
| ☐ | 96df7500-7e82... | GENERAL USER | Alice | alice@abc.com |
| ☐ | 6fc11e17-faf4... | GENERAL USER | | |
| ☐ | 1fb233f6-1f8e... | GENERAL USER | Carol | |
| ☐ | e60a1935-f461... | GENERAL USER | | dave@abc.com |

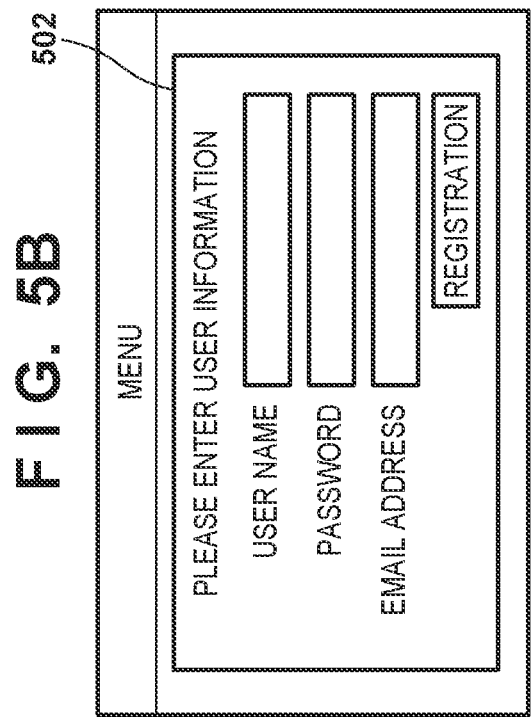
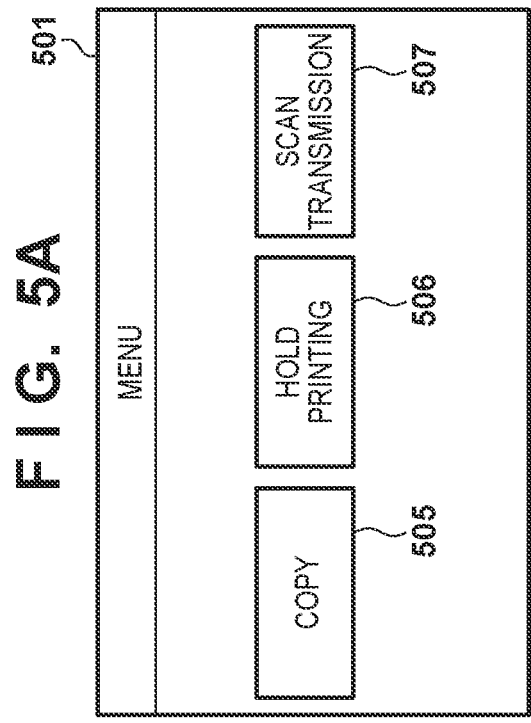
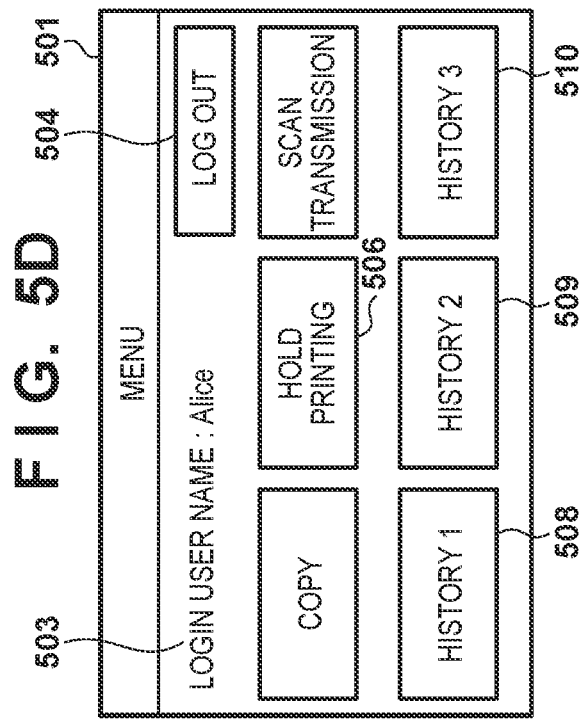
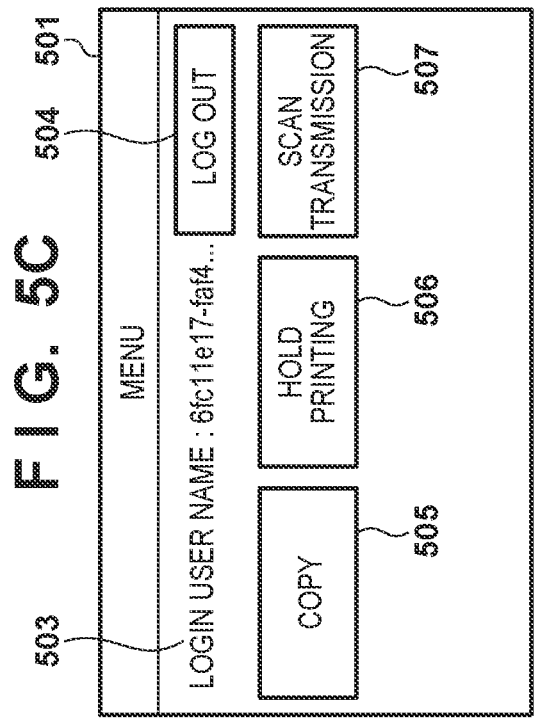

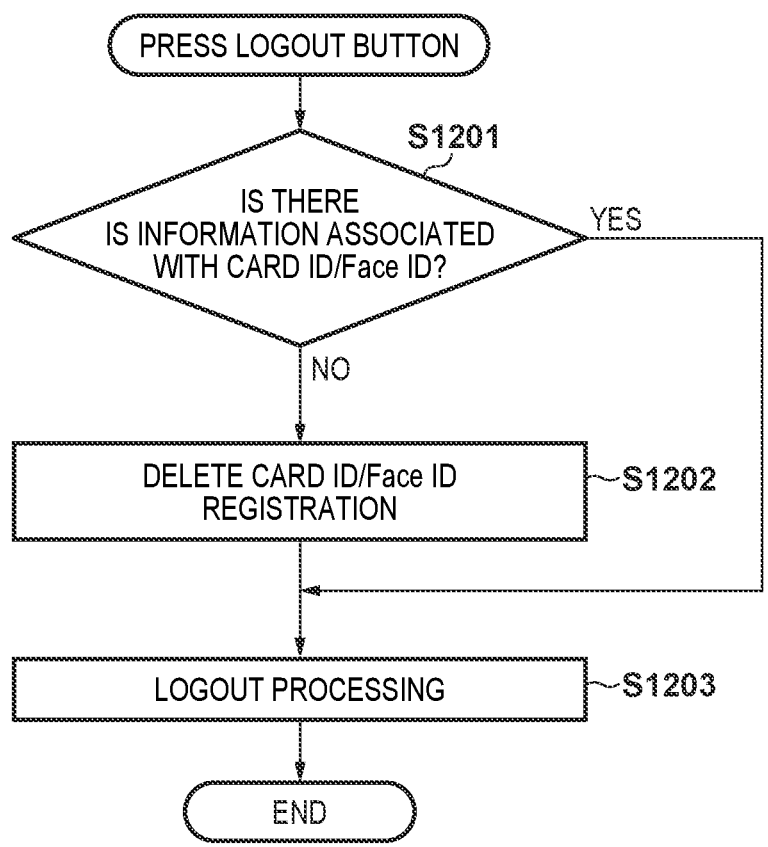

FIG. 13A

USER INFORMATION TABLE

| CARD ID/Face ID | ROLE | USER NAME | PASSWORD | EMAIL ADDRESS | LATEST LOGIN DATE |
|---|---|---|---|---|---|
| | ADMINISTRATOR | Administrator | **** | admin@abc.com | 2020/4/1 |
| 96df7500-7e82.. | GENERAL USER | Alice | | alice@abc.com | 2020/4/2 |
| 6fc11e17-faf4... | GENERAL USER | | | | 2020/4/3 |
| ifb233f6-1f8e.. | GENERAL USER | Carol | | | 2020/4/4 |
| e60a1935-f461... | GENERAL USER | | | dave@abc.com | 2020/4/5 |

FIG. 13B

LOGIN CONTEXT

| ITEM | VALUE |
|---|---|
| CARD ID/Face ID | 96df7500-7e82... |
| USER NAME | |
| ROLE | |
| EMAIL ADDRESS | |

FIG. 13C

LOGIN CONTEXT

| ITEM | VALUE |
|---|---|
| CARD ID/Face ID | 6fc11e17-faf4 |
| USER NAME | |
| ROLE | GENERAL USER |
| EMAIL ADDRESS | |

FIG. 14A

SETTING TABLE

| CARD ID/Face ID | FUNCTION | SETTING |
|---|---|---|
| 6fc11e17-faf4... | SCAN TRANSMISSION | SCAN SETTING: COLOR, 300dpi |
| 96df7500-7e82... | COPY | COPY SETTING: COLOR, SINGLE-SIDED, 1in1 |
| 96df7500-7e82... | SCAN TRANSMISSION | SCAN SETTING: MONOCHROME, 300dpi |

FIG. 14B

OPERATION HISTORY TABLE

| CARD ID/Face ID | No | FUNCTION | SETTING |
|---|---|---|---|
| 6fc11e17-faf4... | HISTORY 2 | SCAN TRANSMISSION | DESTINATION : bob@abc.com<br>SCAN SETTING : COLOR, 300dpi |
| 6fc11e17-faf4... | HISTORY 1 | SCAN TRANSMISSION | DESTINATION : alice@abc.com<br>SCAN SETTING : MONOCHROME, 300dpi |
| 96df7500-7e82... | HISTORY 1 | COPY | COPY SETTING: COLOR, SINGLE-SIDED, 1in1 |
| 96df7500-7e82... | HISTORY 2 | COPY | COPY SETTING : MONOCHROME, DOUBLE-SIDED, 1in1 |
| 96df7500-7e82... | HISTORY 3 | SCAN TRANSMISSION | DESTINATION : alice@abc.com<br>SCAN SETTING: MONOCHROME, 300dpi |

IMAGE FORMING APPARATUS FOR AUTOMATIC REGISTRATION OF USERS USING AN IC CARD TO LOGIN

BACKGROUND OF THE INVENTION

Field of the Invention

The present invention relates to an image forming apparatus, a method of controlling the same, and a storage medium.

Description of the Related Art

There are image forming apparatuses in which a user, by simply holding an IC card of the user over an IC card reader of an image forming apparatus, can log in to the image forming apparatus without having a screen dedicated for login displayed to the user. An image forming apparatus described in Japanese Patent Laid-Open No. 2017-118451 displays on a display a menu screen for selecting a function and in the state obtains information of an IC card held over an IC card reader. Then, in a case where that an IC card is a preregistered IC card, a user who is an owner of the IC card can be allowed to log in to the image forming apparatus.

However, conventionally, in order to log in a user using an IC card, the IC card needed to be preregistered in advance to the image forming apparatus; accordingly, a user could not log in using an unregistered IC card. Also, a user, as they needed to preregister an IC card, needed to know a method of registering their IC card. Also, a user, in order to register an IC card in an image forming apparatus, needed to register the IC card by operating a user management screen or an IC card registration screen of the image forming apparatus, and operation for registering the IC card took a lot of time and effort.

SUMMARY OF THE INVENTION

An aspect of the present invention is to eliminate the above-mentioned problem with conventional technology.

The feature of the present invention is to provide a technique that enables, by, for example, authenticating with an IC card or the face of a user, use of a function of an image forming apparatus without preregistering in advance in the image forming apparatus information for authenticating a user.

According to a first aspect of the present invention, there is provided an image forming apparatus, comprising: a display; a reader that reads an IC card; and a controller including a processor and a memory, the controller being configured to: perform settings for user authentication; display, on the display, a menu screen for selecting a function of the image forming apparatus; and cause, in a case where in user authentication using the IC card and automatic registration of user information are set in the settings, when the reader detects the IC card, the image forming apparatus to log in a user of the IC card using information of the IC card.

According to a second aspect of the present invention, there is provided a method of controlling an image forming apparatus, the method comprising: performing settings for user authentication; displaying, on a display, a menu screen for selecting a function of the image forming apparatus; reading an IC card; causing, in a case where, in the settings, user authentication by the IC card and automatic registration of user information are set and when the reader detects the IC card, the image forming apparatus to log in a user of the IC card using information of the IC card.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a view illustrating an example of a screen of a UI (user interface) of a user authentication setting that a remote UI of the MFP according to the embodiment provides.

FIGS. 5A to 5D depict views of examples illustrating menu screens displayed on a local UI of the MFP according to the embodiment.

FIG. 12 is a flowchart for describing processing for when the logged-in user logs out in the MFP according to the embodiment.

FIGS. 13A to 13C depict views illustrating examples of a user information table and login context according to the embodiment.

FIG. 14A depicts a view illustrating an example of a setting table according to the embodiment.

FIG. 14B depicts a view illustrating an example of an operation history table according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined. In the following embodiments, an example of an image forming apparatus according to the present invention will be described using as an example an MFP (Multifunction Peripheral) 101 that comprises functions such as copying, printing, and scanning.

Figure 1:
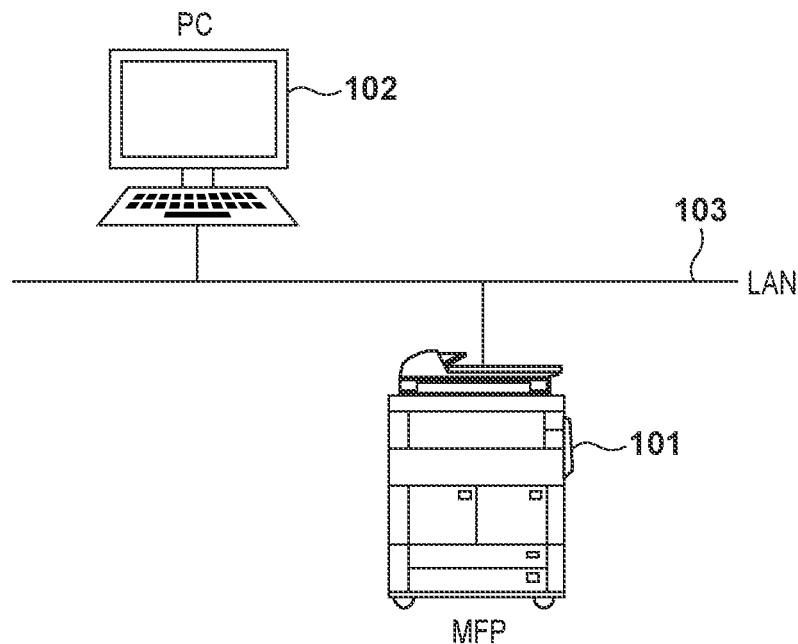
FIG. 1 depicts a view for describing a configuration of a print system according to an embodiment of the present invention.

FIG. 1 depicts a view for describing a configuration of a print system according to an embodiment of the present invention.

This print system comprises an MFP 101 and a PC (personal computer) 102, and the MFP 101 receives print jobs from a terminal (the PC 102) connected via a network (LAN) 103 and executes printing. Note that, in FIG. 1, one PC 102 and one MFP 101 are illustrated in a configuration in which they are connected; however, the number of these devices is not limited to the configuration of FIG. 1, and configuration may be taken such that another device is additionally connected to the network 103.

Figure 2:
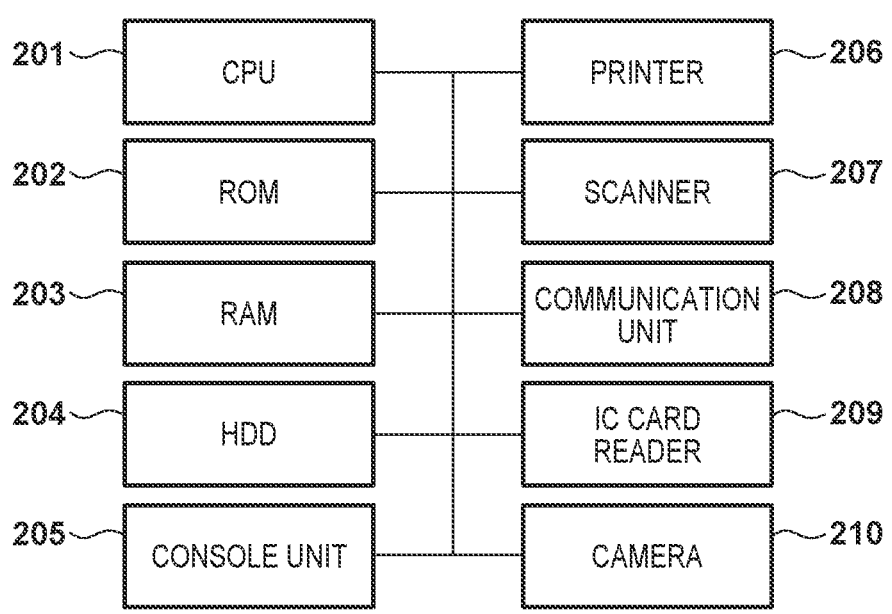
FIG. 2 is a block diagram for describing a hardware configuration of an MFP according to the embodiment.

FIG. 2 is a block diagram for describing a hardware configuration of the MFP 101 according to the embodiment.

A CPU 201 is a central processing unit (processor) that controls all of the operations of the MFP 101. A RAM (Random Access Memory) 203 is a volatile memory, provides a work area of the CPU 201, and is used as a temporary storage region for deploying various control programs stored in a ROM 202 and an HDD 204. The ROM 202 is a non-volatile memory and stores a boot program of the MFP 101 and various kinds of data. The HDD (hard disk drive) 204 is a larger-capacity non-volatile storage apparatus in comparison to the RAM 203. In the HDD 204, programs for control, an OS (Operating System), and various application programs of the MFP 101 are stored.

The CPU 201, at the time of activation of the MFP 101, executes the boot program stored in the ROM 202. This boot program is for reading out and then deploying in the RAM 203 programs such as the OS (Operating System) stored in the HDD 204. The CPU 201, after executing the boot program, performs control of the MFP 101 by successively executes programs such as the OS deployed to the RAM 203. Also, the CPU 201 also stores, in the RAM 203, data used in operations by programs for control and performs control of the MFP 101 using that data.

Note that, regarding the MFP 101 according to the embodiment, it is assumed that one CPU 201 executes each of processing described in later-described flowcharts; however, another configuration may be taken. For example, configuration may be taken such that a plurality of CPUs or microprocessors (MPUs) executes in cooperation each of the processing illustrated in the later-described flowcharts. Also, configuration may be taken such that some of the later-described processing are executed using a hardware circuit such as an ASIC (Application Specific Integrated Circuit) or an FPGA (Field-Programmable Gate Array).

A console unit 205 includes a hard key and a display that has a touch panel function. A printer 206 prints print data received via a communication unit 208 from, for example, the PC 102 and digital image data obtained by a scanner 207. The scanner 207, by scanning a paper document, obtains image data of the document. The communication unit 208 is a network interface for connecting to the Internet and a LAN (Local Area Network) 103 of an office. An IC card reader 209 is a device that reads out information, from an IC card, to be used in user authentication and a unit that is necessary for realizing authentication by the IC card. A camera 210 captures the face of a user that uses the MFP 101. The camera 210 may be, for example, an externally-attached camera (image capturing unit) that can connect via a USB or a wireless LAN.

Note that a hardware configuration of the PC 102 is almost the same as a configuration in which the printer 206, the scanner 207, and the like have been excluded from the configuration of the MFP 101 of FIG. 2; accordingly, description of the configuration thereof will be omitted here.

Figure 3:
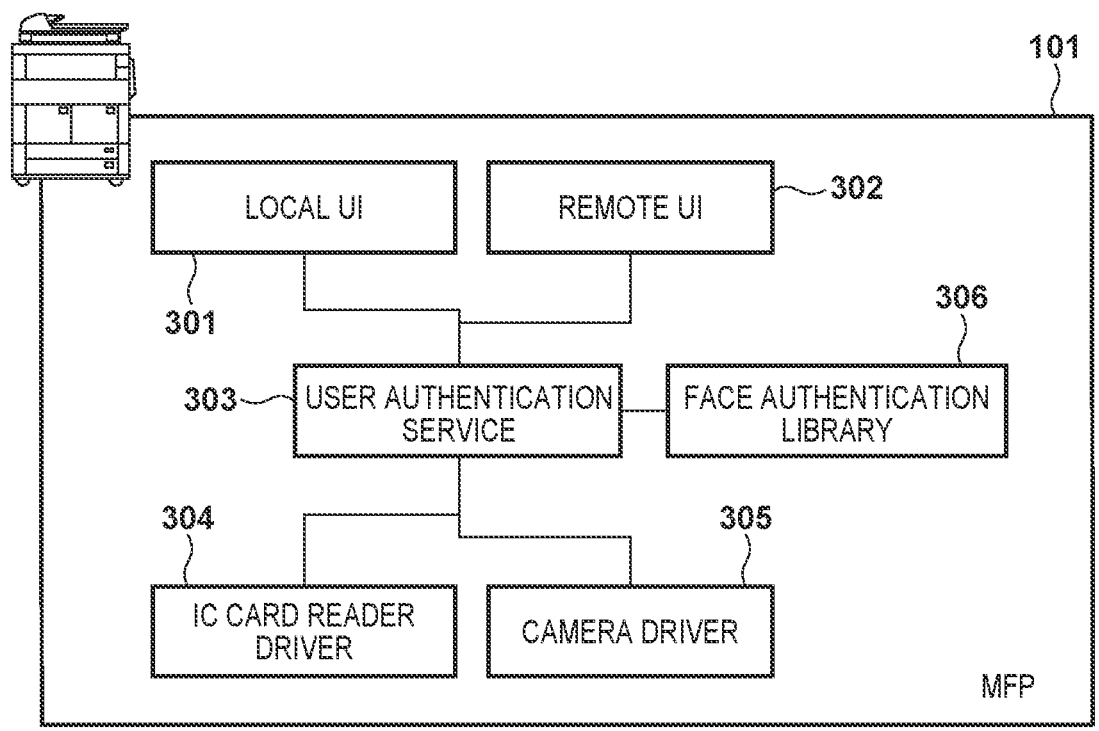
FIG. 3 is a functional block diagram for describing a software configuration of the MFP according to the embodiment.

FIG. 3 is a functional block diagram for describing a software configuration of the MFP 101 according to the embodiment.

A local UI (user interface) module 301 of the MFP 101 provides a user interface for accepting user operations via the hard key or the display of the console unit 205 and for the user to change settings or use functions of the MFP 101. A remote module 302 controls communication by the communication unit 208. The remote UI module 302 has an HTTP (Hypertext Transfer Protocol) server function and provides to a user with a user interface configured by HTML (HyperText Markup Language). A user can change settings and use functions of the MFP 101 by accessing the remote UI module 302 using a web browser of the user's terminal. A user authentication service module 303 is a software module that authenticates a user that uses the local UI module 301 or the remote UI module 302. The user authentication service module 303 authenticates a user that uses the local UI module 301 by an IC card or face authentication. Also, the user authentication service module 303 authenticates a user that uses the remote UI module 302 by a user name and a password. The IC card reader driver 304 is a driver that controls the IC card reader 209, obtains information from an IC card, and provides information obtained from the IC card to the user authentication service module 303. A camera driver 305 is a driver that controls the camera 210. The camera driver 305 provides a captured image obtained from the camera 210 to the user authentication service module 303. A face authentication library module 306 is a software module that performs face authentication. The face authentication library module 306 comprises functions such as the following.

As a face information registration function, accepting as an input a face image, and managing face information (the face image and the feature amount of the face) by storing the face information in the HDD 204. Issuing and outputting a Face ID as an identifier that uniquely identifies a person identified from the face information.

As a face authentication function, accepting as an input a face image, comparing and verifying the face image with face information registered in the HDD 204, and outputting a Face ID and a score of a candidate.

As a face information deregistration function, accepting as an input a Face ID and deleting from the HDD 204 the face information associated with the Face ID.

Also, although they are not illustrated, the MFP 101 comprises a plurality of software modules that realizes, by controlling the printer 206 and the scanner 207, print, scan, and copy functions.

Next, settings related to user authentication will be described. The MFP 101 stores in a user information table as illustrated in FIG. 13A and manages user information. This user information table is a database stored in the HDD 204. In this user information table, card IDs used for IC card authentication, Face IDs used for face authentication, user names and passwords used for access by the remote UI, user roles (such as administrator/general user), email addresses, latest login dates, and the like are stored.

FIG. 4 depicts a view illustrating an example of a screen of a UI (user interface) of a user authentication setting of the MFP 101 that the remote UI module 302 of the MFP 101 according to the embodiment provides. Note that this screen may be configured such that not only the remote UI module 302 but also the local UI module 301 provides the same UI screen for the administrator.

A local UI login setting 401 is used for setting a method of login by the local UI. Here, one can be selected by checking any one of radio buttons corresponding to no authentication, IC card authentication, and face authentication. In a case where the face authentication is selected, a score, which is a setting value for determining that authentication is successful, is set as a face authentication score 402. Here, a score of "80" is set.

User information registration 403 is a setting related to user information registration. Here, user information registration can be set as enabled/disabled by a check box of an automatic user registration. Here, when an unregistered IC card is detected in a state in which the radio button of the IC card authentication of the local UI login setting 401 is checked and enabled and a check box of the automatic user registration is checked and set as enabled, a card ID of the IC card is registered in the user information table (FIG. 13A) as new user information. Also, when a face of an unregistered user is detected in a state in which the radio button of the face authentication of the local UI login setting 401 is checked and enabled and the check box of the automatic user registration is checked and enabled, face information of the unregistered user is stored in the HDD 204 using the face authentication library module 306. Furthermore, a Face ID of that obtained face information is registered in the user information table as new user information. Also, in a case where the automatic user registration is enabled, enabling/disabling of "display registration screen at time of initial login" can be set by the check box thereof. In a case where the check box of "display registration screen at time of initial login" is checked and enabled, when an unregistered IC card or face information is detected and the automatic registration is performed, a screen for having a user input user information (such as a user name, a password, and an email address) other than a card ID and a Face ID is displayed.

User information deletion 404 is a setting related to an automatic user information deletion. Enabling/disabling of the automatic user deletion can be set by the check box thereof. In a case where the check box of the automatic user deletion is checked and enabled, user information for which a certain period has elapsed since the latest login date is automatically deleted. Here, it is made possible to set a time period from the latest login date to deletion, and it is set to "30 days". A table 405 of FIG. 4 provides a user interface for displaying/registering/editing/deleting user information in the user information table. The table 405 illustrates an example in which user information is displayed based on a table of FIG. 13A. By checking a check box on each row of the table 405, user information of the row can be edited or deleted. Note that information set via this screen of FIG. 4 is stored in the RAM 203 or the HDD 204.

Next, operations in a case where the IC card authentication is set as enabled as in the screen of FIG. 4 will be described. The operations described below are executed by the CPU 201 deploying in the RAM 203 programs from the ROM 202 or the HDD 204 that execute the functions illustrated in FIG. 3 and then executing the deployed programs.

FIGS. 5A to 5D depict views of examples illustrating menu screens displayed by the local UI module 301 of the MFP 101 according to the embodiment.

The MFP 101, when activated, displays by the local UI module 301 a menu screen 501 illustrated in FIG. 5A that enables selection of a function. At this time, the user authentication service module 303, based on the information set on the screen of FIG. 4 stored in the RAM 203, activates via the IC card reader driver 304 the IC card reader 209 and has it enter a state in which it can detect an IC card.

Figure 6:
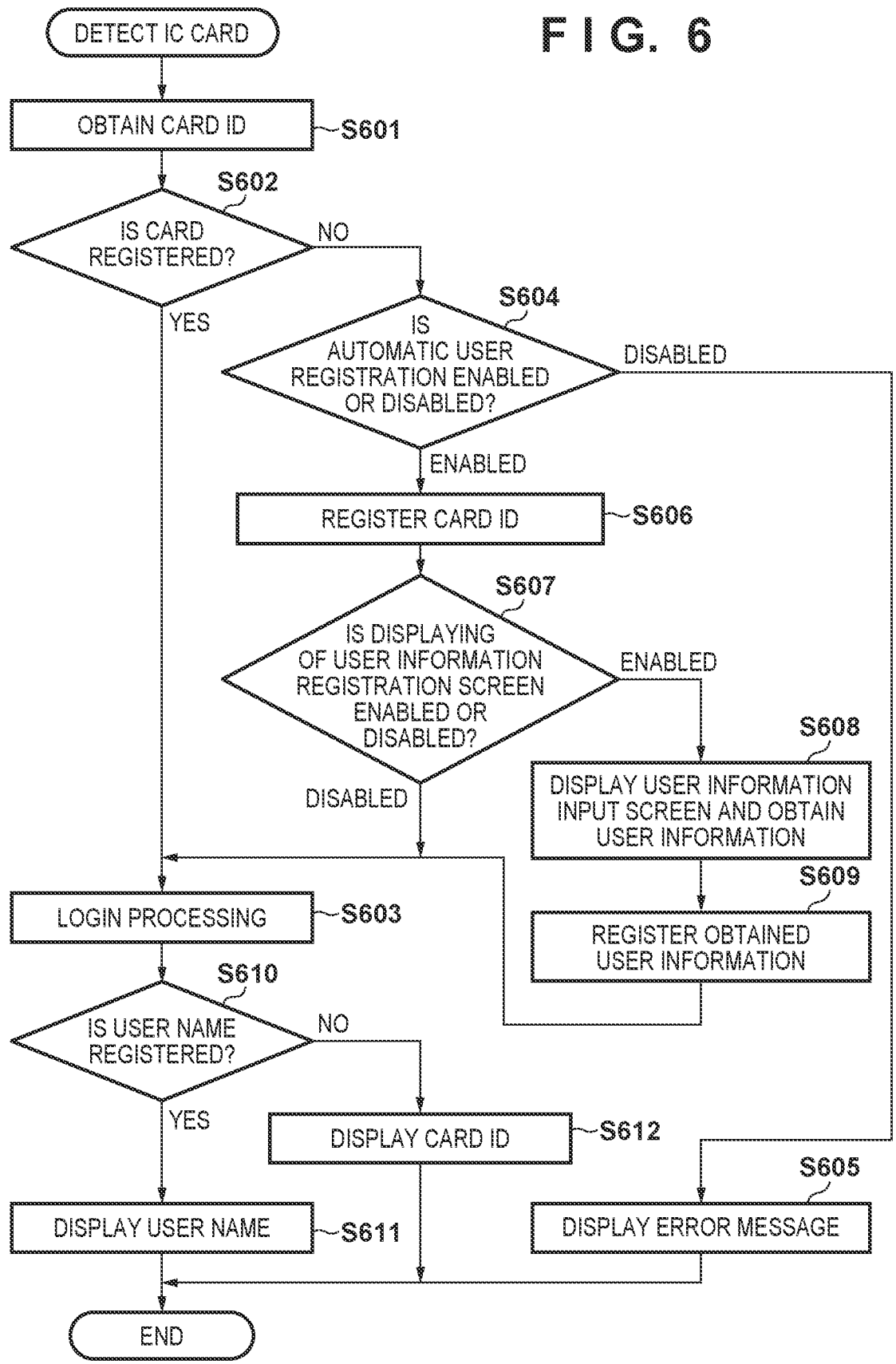
FIG. 6 is a flowchart for describing processing for when an IC card reader, in a state of being able to detect an IC card, detects an IC card in the MFP according to the embodiment.

FIG. 6 is a flowchart for describing processing for when the IC card reader 209, in a state of being able to detect an IC card as described above, detects an IC card in the MFP 101 according to the embodiment. Note that the processing described in this flowchart is achieved by the CPU 201 executing a program that has been deployed to the RAM 203.

First, in step S601, the CPU 201 functions as the user authentication service module 303, and when it detects via the IC card reader driver 304 that an IC card is held over the IC card reader 209, obtains a card ID from the IC card. Note that this card ID may be any information, such as a manufacturing number of the IC card or an employee code prestored in the card, so long as it can uniquely identify the owner of the IC card. Next, the processing advances to step S602, and the CPU 201 functions as the user authentication service module 303 and determines whether or not the obtained card ID is registered in the user information table (FIG. 13A). Here, if the card ID is determined as registered, the processing advances to step S603, and processing for having the user log in is performed. In this login processing, user information (such as a user name and an email address) stored in association with the card ID is obtained from the user information table of FIG. 13A and then a structure (herein after login context) that stores logged-in user information is generated in the RAM 203. Information stored in this login context is illustrated in FIG. 13B. Essential items in this login context are a card ID/Face ID, a user name, a role, and an email address. In a case where a user name and an email address are unregistered in the user information table illustrated in FIG. 13A, a user name and an email address are not stored in the login context. Also, at this time, the user authentication service module 303 stores a login date in the user information table. Furthermore, the user authentication service module 303, together with login context, notifies the local UI module 301 that a user logged in.

Meanwhile, in a case where it is determined in step S602 that it is an unregistered card ID, which is not registered, the processing advances to step S604, and the CPU 201, based on the information set in the screen illustrated in FIG. 4 stored in the RAM 203, determines whether or not the checkbox of the automatic user registration is checked, in other words, enabled. In a case where the check box is not checked and the automatic user registration is disabled, the processing advances to step S605, and the CPU 201 via the local U module 301 performs an error display to the effect that login is not possible and ends this processing.

Meanwhile, in a case where the CPU 201 determines in step S604 that the automatic user registration is enabled, the processing advances to step S606, and the CPU 201 registers the card ID of the card in the user information table as new user information. At this time, the CPU 201 registers "general user" as a role of the new user. Next, the processing advances to step S607, and the CPU 201 functions as the user authentication service module 303 and based on the information set in the screen illustrated in FIG. 4 stored in the RAM 203, determines whether or not the check box of "display registration screen at time of initial login" is checked, in other words, enabled. In a case where the check box of "display registration screen at time of initial login" is checked and enabled here, the processing advances to step S608. In step S608, the CPU 201 displays on the console unit 205 a screen 502 (FIG. 5B) for having the user input user information (such as a user name, a password, and an email address) other than a card ID and then obtains values inputted by the user. The user via the screen 502 can register user information by inputting a user name, a password, and an email address and then pressing a registration button. Then, the processing advances to step S609, and the CPU 201 functions as the user authentication service module 303, registers in the user information table in association with the card ID the user information obtained in step S608, and then advances to step S603.

Also, in a case where it is determined in step S607 that the check box of "display registration screen at time of initial login" is not checked and disabled, the processing advances to step S603, and login processing is performed in a state in which only a card ID and a role are stored in the user information table. In such a case, the login context as illustrated in FIG. 13C in which only a card ID and a role are stored is generated, and it is notified that a user logged in to the local UI module 301.

When login processing is executed in step S603, the processing advances to step S610. In step S610, the CPU 201 functions as the local UI module 301 and displays a login user name 503 on the menu screen 501 as illustrated in, for example, FIG. 5C, such that it is known that the user is logged in. At this time, the CPU 201, regarding this login user name, determines whether or not a user name is registered by whether or not a user name can be obtained from the login context. In a case where the user name was obtained here, the processing advances to step S611, the user name is displayed on the console unit 205, and this processing is ended. This example is illustrated in FIG. 5D. In FIG. 5D, an obtained user name (Alice) is displayed as the login user name 503.

Meanwhile, the CPU 201, in a case where it determines in step S610 that a user name was not obtained, the processing advances to step S612, and the CPU 201 displays the card ID instead of the user name. This example is illustrated in FIG. 5C. In FIG. 5C, a card ID (6fc11e17-faf4 . . . ) is displayed as the login user name 503 instead of the user name. Also, at this time, in FIGS. 5C and 5D, a logout button 504 is displayed on the menu screen 501.

As described above, in a case where the automatic user registration is set as enabled, it is possible to, only by holding an unregistered IC card over the IC card reader, register the IC card and perform login of a user who owns the IC card. By this, it is possible to newly register IC cards without any operation of the console unit 205 of the MFP 101. By this, it is possible to prevent spending a lot of time or effort in operation for registering IC cards. Also, it is possible to detect an IC card and log in a user even in a state in which the menu screen 501 is displayed as illustrated in FIG. 5A; accordingly, there is an effect that displaying and operating an authentication screen also become unnecessary.

Next, operation in a case where a user, after logging in with an IC card, selects hold printing 506 from the menu screen 501 of FIG. 5A will be described with reference to the drawings.

Figure 7:
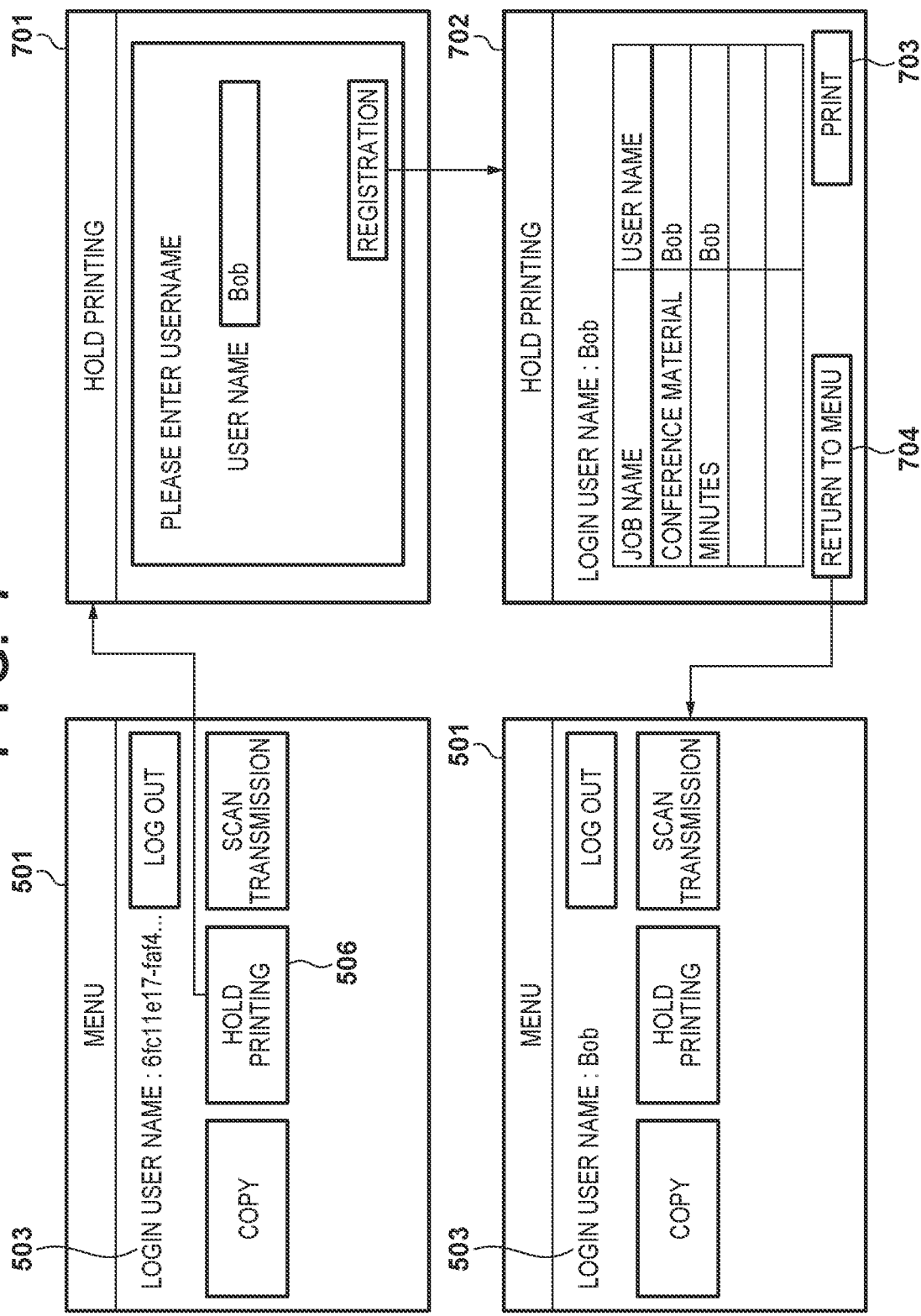
FIG. 7 depicts a view illustrating examples of operation screens and screen transitions for when using a hold printing function in the MFP according to the embodiment.

FIG. 7 depicts a view illustrating examples of operation screens and screen transitions for when using a hold printing function in the MFP 101 according to the embodiment.

Hold printing is a function that, instead of immediately printing a print job received from the printer driver of a terminal (e.g., the PC 102) on a network, temporarily holds the print job within the MFP 101. A print job received from the print driver includes a user name, which is an account name of a user logged in to the terminal. Here, the user name included in the print job is called a job owner name. The user, by selecting at least one of their held print jobs and then pressing a print button 703 on a screen 702 that the local UI module 301 provides via the console unit 205, can perform printing of the selected print job.

Figure 8:
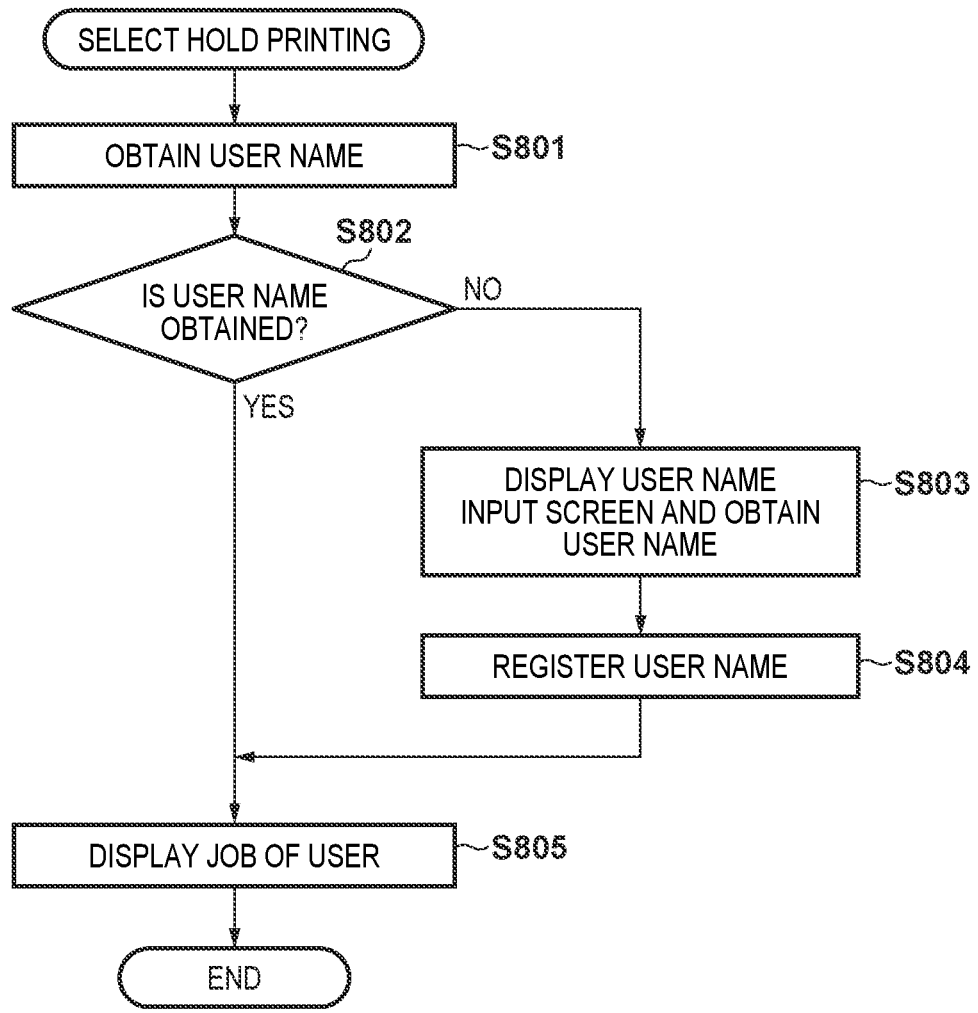
FIG. 8 is a flowchart for describing processing for when the hold printing function is selected from the menu screen in the MFP according to the embodiment.

FIG. 8 is a flowchart for describing processing for when the hold printing 506 is selected from the menu screen 501 in the MFP 101 according to the embodiment. Note that the processing described in this flowchart is achieved by the CPU 201 executing a program that has been deployed to the RAM 203.

First, in step S801, the CPU 201 functions as the local UI module 301 and, when it detects that the hold printing 506 is selected in the menu screen 501, tries obtaining of a user name of the user from the login context. Then, the processing advances to step S802, and the CPU 201 determines whether or not the user name was obtained, and if it was obtained, the processing advances to step S805. Meanwhile, in a case where the user name was not obtained in step S802 due to the user name not being stored in the login context, the processing advances to step S803. In step S803, the CPU 201 functions as the local UI module 301, displays on the console unit 205 a screen 701 for inputting the user name as illustrated in FIG. 7, and obtains via the screen 701 the inputted user name. In other words, the user, by inputting a user name and then pressing the registration button on the screen 701, can input the user name. Then, the processing advances to step S804, and the CPU 201 registers in the login context and the user information table in association with the card ID the user name obtained in step S803 and the processing advances to step S805.

In step S805, the CPU 201 functions as the local UI module 301 and compares the obtained user name and the job owner name of the print job held in the MFP 101. Then, for example, the screen 702, in which only the print jobs whose names coincide are the logged-in user's jobs, illustrated in FIG. 7 is displayed. In the screen 702 of FIG. 7, a list of print jobs that a user (Bob) having the user name (Bob) stores is displayed. Here, the user (Bob), by selecting from the list a print job that he wants to print and then pressing the print button 703, can print his desired print job that is being held for the user name (Bob).

As described above, it is possible to, when a user whose name is unregistered uses a function (e.g., hold printing) that needs a user name for the first time, request input of a user name and register the inputted user name. By this, the user name becomes registered hereinafter, and if, for example the user redisplays the menu screen by pressing a return to menu button 704 in the screen 702 of FIG. 7, the user name instead of the card ID will be displayed as the login user name 503 of the menu screen.

<Scan Transmission>

Next, operation in a case where a user, after logging in using an IC card, selects a scan transmission 507 on the menu screen 501 of FIG. 5A will be described with reference to the drawings.

Figure 9:
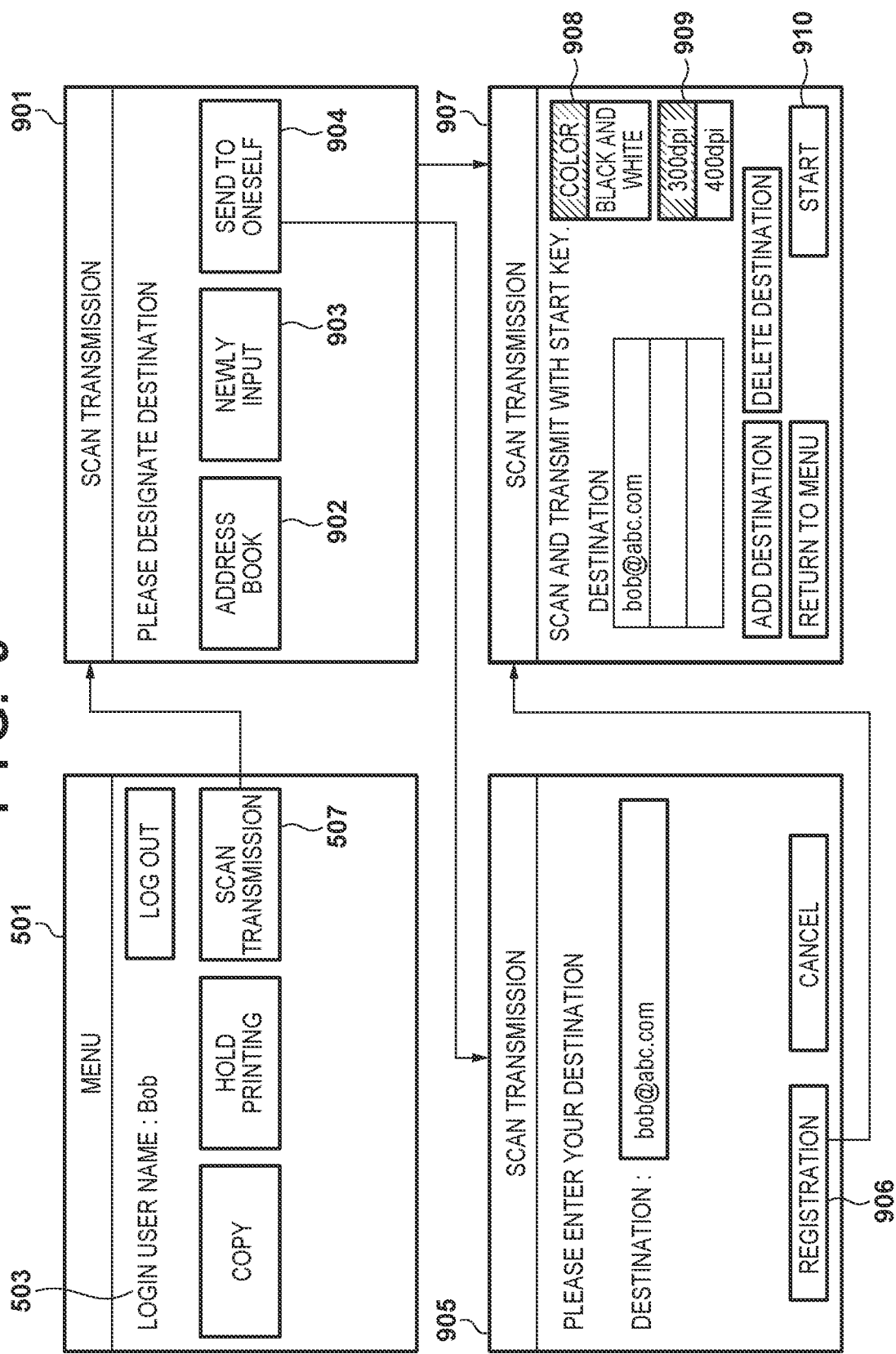
FIG. 9 depicts a view for describing operation screens and screen transitions for when a user uses a scan transmission function in the MFP according to the embodiment.

FIG. 9 depicts a view for describing operation screens for when a user uses a scan transmission function and transition of these screens in the MFP 101 according to the embodiment. Note that, in FIG. 9, it is assumed that a user, "Bob", registered the user name at the time of using hold printing illustrated in FIG. 7; accordingly, "Bob" is displayed as the login user name 503 of the menu screen 501. Also, it is possible for a user logging in for the first time to use the scan transmission without registering a user name. In such a case, a card ID is displayed as illustrated in, for example, FIG. 5C as the login user name 503 of the menu screen 501.

When it is detected that a button for the scan transmission 507 is pressed on the menu screen 501, transition is made to a destination selection screen 901 for the scan transmission. On this destination selection screen 901, a send to oneself button 904 is included. Also, on the destination selection screen 901, an address book button 902 by which a destination can be selected from a registered address book is included. Also, a newly input button 903 by which a desired address can be newly inputted is included. When the scan transmission destination is set in this way, a scan transmission screen 907 is displayed and performs display of the set address. On the scan transmission screen 907, setting buttons such as a color/monochrome setting 908 and a resolution setting (300 dpi/400 dpi) 909 are further included as scan settings.

Figure 10A:
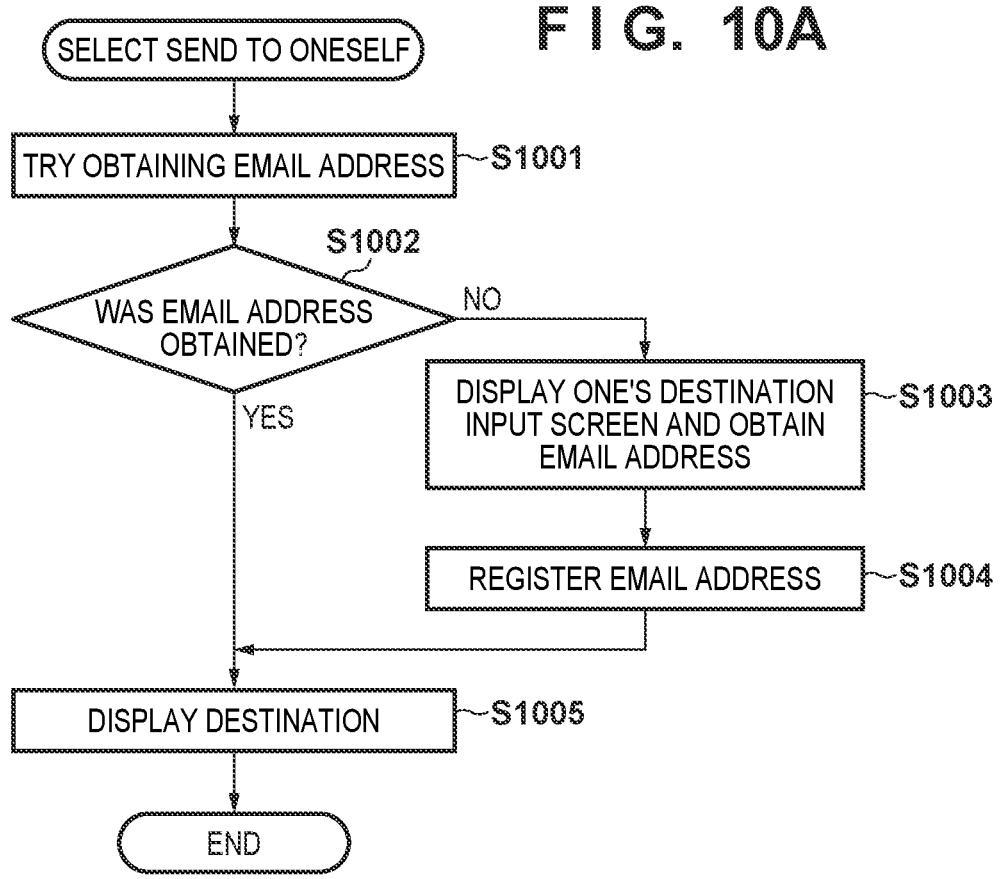
FIG. 10A is a flowchart for describing processing in a case where, when the user executes the scan transmission function, selects a send to an oneself button in the MFP according to the embodiment.

FIG. 10A is a flowchart for describing processing in a case where, when the user executes the scan transmission function, selects the send to oneself button 904 in the MFP 101 according to the embodiment. Note that the processing described in this flowchart is achieved by the CPU 201 executing a program that has been deployed to the RAM 203.

In step S1001, the CPU 201, when it detects that the send to oneself button 904 is selected from the scan transmission screen 901 of FIG. 9, functions as the local UI module 301 and tries obtaining an email address from the login context. Then, the processing advances to step S1002, and the CPU 201 determines whether or not an email address was obtained. In a case where, at this time, an email address was not obtained due to reasons such as an email address is not stored in the login context, the processing advances to step S1003. Meanwhile, in a case where the email address was obtained, the processing advances to step S1005. In step S1003, the CPU 201 functions as the local UI module 301, displays a screen 905 illustrated in FIG. 9 in which their destination (email address) is inputted, and obtains the email address inputted via the screen 905, in the screen 905, the user (Bob) inputs his email address and then presses a registration button 906. By this, the user's email address is obtained. Then, the processing advances to step S1004, and the CPU 201 registers in the login context and the user information table in association with the card ID the obtained email address and the processing advances to step S1005. In step S1005, the CPU 201 functions as the local UI module 301 and displays the scan transmission screen 907 with the obtained email address as the transmission destination. When a start button 910 is pressed on the scan transmission screen 907, the scan transmission to the set destination is started.

As described above, it is possible to, when a user whose email address is unregistered uses a function (such as send to oneself) that needs an email address as their destination for the first time, request an input of the user's email address and have the user register the user's email address. Hereinafter, the user's email address is registered.

Figure 10B:
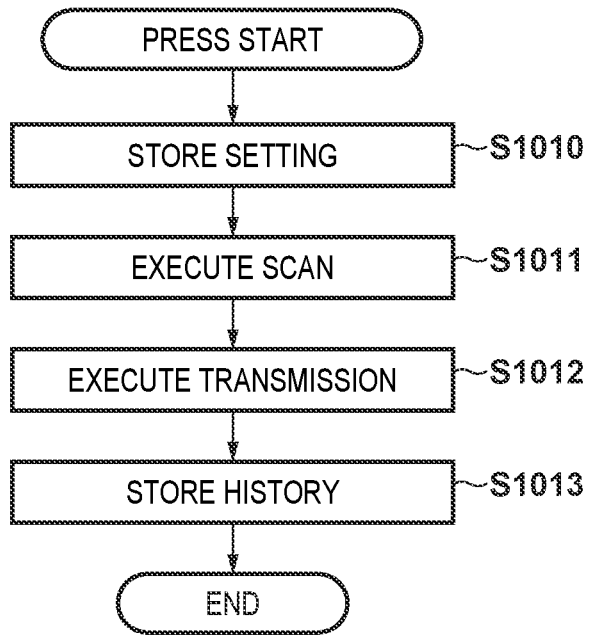
FIG. 10B is a flowchart for describing processing executed by the user pressing a start button on the scan transmission screen.

FIG. 10B is a flowchart for describing processing executed by the user pressing the start button 910 on the scan transmission screen 907 in the MFP 101 according to the embodiment. Note that the processing described in this flowchart is achieved by the CPU 201 executing a program that has been deployed to the RAM 203.

First, in step S1010, the CPU 201 stores in the HDD 204 as a setting table a scan setting (a color/monochrome, setting and a resolution setting) in association with the card ID as illustrated in, for example, FIG. 14A. Next, the processing advances to step S1011, and the CPU 201 starts scanning of a document and converts an image of the document to digital data (e.g., a PDF file). Next, the processing advances to step S1012, and the CPU 201 transmits the digital data to a designated destination. Then, the processing advances to step S1013, and the CPU 201 associates with a card ID as in a table illustrated in FIG. 14B, as a history processing that the user executed and stores it in the HDD 204 as an operation history table.

The setting table illustrated in FIG. 14A stores for the same setting information one entry for each user. Meanwhile, the operation history table can store for the same setting information a plurality of instances of setting performed in the past.

Similarly, in a case where a logged-in user uses the copy function by pressing a copy button 505 in FIG. 5A, a copy setting (a color/monochrome setting, a single-sided/double-sided setting, and a layout setting such as 1 in ½ in 1) that the user last performed is stored in the setting table illustrated in FIG. 14A in association with a card ID. Then, after copying is executed, setting information of the copying is stored as a history in, for example, the operation history table illustrated in FIG. 14B.

The setting stored in the setting table illustrated in FIG. 14A is held also after the user has logged out. Then, when the user logs in again and the scan transmission screen 907 or a copy screen (not shown) is displayed again, the stored settings are loaded and used for restoring a last set state.

Also, in the menu screen 501 of FIG. 5D, shortcut buttons 508 to 510 for, in a case where there is an operation history associated with the logged-in user's card ID, referencing the operation history table illustrated in FIG. 14B and using the history information are displayed. When a shortcut button is pressed, a screen of a function stored in the history information corresponding to the pressed button is displayed and settings stored in the history information are restored. By this, it is possible to reproduce with one touch the settings that the logged-in user has set in the past.

Next, operation in a case where the face authentication is set as enabled in the user authentication setting screen of FIG. 4 and a main difference from when IC card authentication is enabled will be described.

In a case where the face authentication is selected in the local UI login setting 401 of FIG. 4, the local UI module 301, when the MFP 101 is activated, displays the menu screen 501 that enables selection of a function. The user authentication service module 303, based on the information set on the screen as shown in FIG. 4 and stored in the RAM 203, activates the camera 210 via the camera driver 305 for performing the face authentication and captures the face of a person that has appeared in the camera 210. A software module (not shown) is used for detecting the face. For example, open-source OpenCV is generally known as a library that has a function such as image processing/image analysis and machine learning and such an open-source library may be used for face detection.

Figure 11:
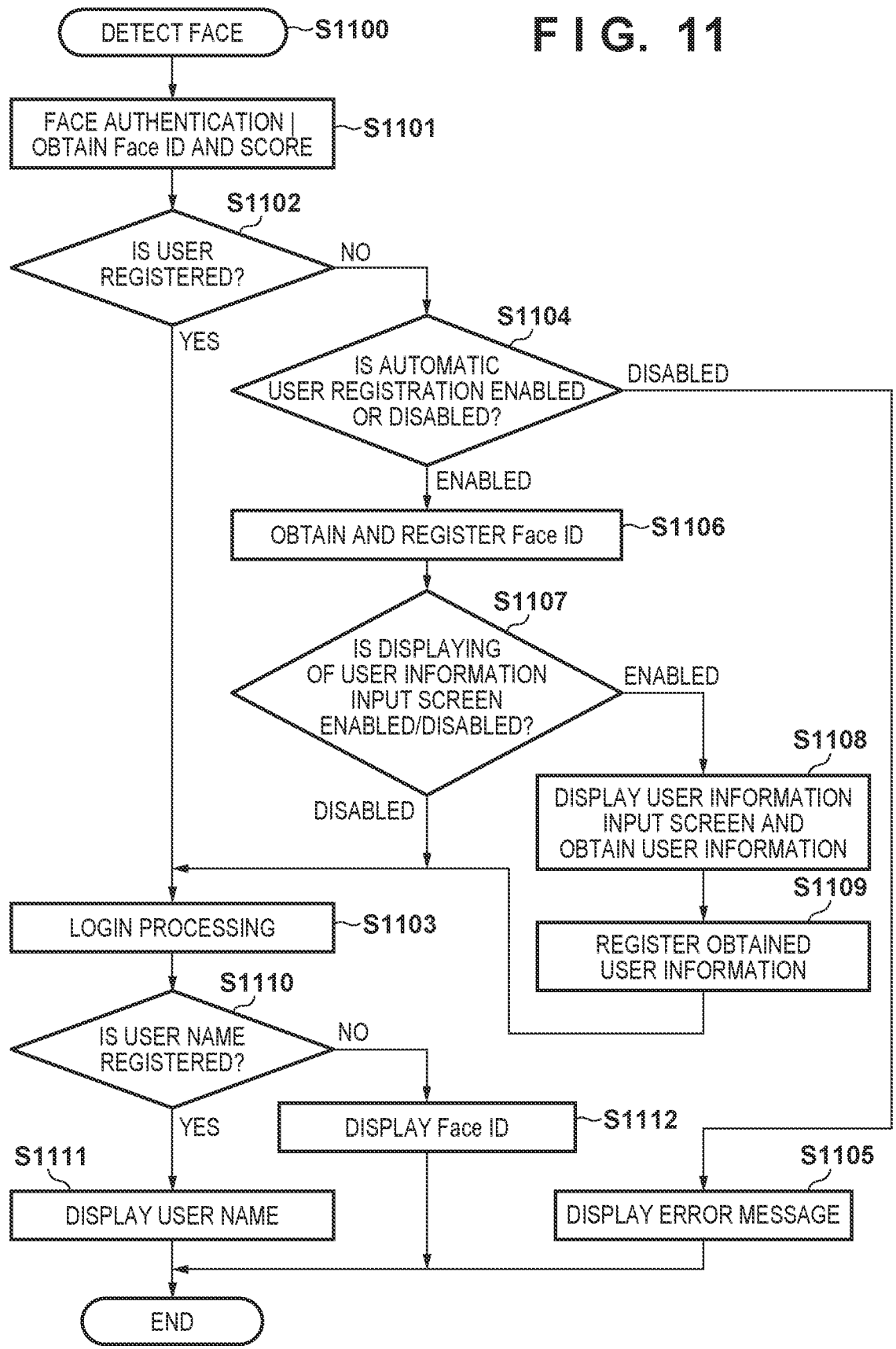
FIG. 11 is a flowchart for describing operation at the time of face detection in the MFP according to the embodiment.

FIG. 11 is a flowchart for describing operation at the time of face detection in the MFP 101 according to the embodiment. Note that the processing described in this flowchart is achieved by the CPU 201 executing a program that has been deployed to the RAM 203.

First, in step S1100, the CPU 201 functions as the user authentication service module 303 and obtains a face image by capturing, by the camera 210, the face of a user that uses the menu screen 501. Next, the processing advances to step S1101, and the CPU 201 functions as the user authentication service module 303 and performs the face authentication using the face authentication library module 306. Specifically, the user authentication service module 303 inputs the face image into the face authentication library module 306. Then the user authentication service module 303 compares and verifies with face information registered in the HDD 204 and outputs a Face ID and a score of a candidate. Then, the processing advances to step S1102, and the CPU 201 functions as the user authentication service module 303 and determines whether or not the user is registered using the Face ID and the score of the candidate outputted from the face authentication library module 306. In a case where the Face ID of the candidate was not obtained from the face authentication library module 306 or in a case where the score related to the obtained Face ID is lower than the value set in the face authentication score 402 of FIG. 4, the user is determined as unregistered. When the user is determined as unregistered in this way, the processing advances to step S1104.

Meanwhile, in a case where the Face ID of the candidate was obtained from the face authentication library module 306 and the score related to the obtained Face ID is higher than the score set in the face authentication score 402, the user is determined as registered, and the processing advances to step S1103. In step S1103, the CPU 201 obtains the information registered in association with the Face ID from the user information table illustrated in, for example, FIG. 13A, performs login processing of the user thereof, and the processing advances to step S1110.

Meanwhile in a case where the user is determined as unregistered in step S1102, the processing advances to step S1104. In step S1104, the CPU 201 determines whether or not the automatic user registration was set as enabled in the user information registration 403 of the screen of FIG. 4 and, if enabled, the processing advances to step S1106. In step S1106, the CPU 201 functions as the user authentication service module 303, inputs the face image into the face authentication library module 306, and requests registration of the face information. At this time, the CPU 201 functions as the face authentication library module 306, issues the Face ID as an identifier that uniquely identifies the person specified from the face image, and stores in the HDD 204 the face information (the face image and the feature amount of the face) in association with the Face ID. In this way, the face authentication library module 306 outputs the Face ID as a response of a result of face information registration. Then, the CPU 201 functions as the user authentication service module 303 and registers in the user information table illustrated in FIG. 13A, as the information of a new user the obtained Face ID. Regarding the login processing and the logged-in processing thereafter in steps S1103, S1105, and S1107 to S1112, there is no difference from the previously described processing in steps S603, S605, and S607 to S612 of FIG. 6 other than that the Face ID is used instead of the card ID; accordingly, description thereof will be omitted.

As described above, in a case where the automatic user registration is set as enabled, it is possible to perform face information registration and login without any operation of the console unit 205, and it does not take any effort to register face information in advance. Also, configuration is such that even in a state in which the menu screen is displayed, it is possible to detect a face of a user and log in the user; accordingly, there is an effect that operation for displaying the authentication screen becomes unnecessary.

Next, operation for when the logged-in user logs out will be described.

FIG. 12 is a flowchart for describing processing for when the logged-in user logs out in the MFP 101 according to the embodiment.

In this processing, the CPU 201 functions as the user authentication service module 303, and this processing is started by detecting that the user pressed the Logout button 504 of FIG. 5C via the local UI module 301. First, in step S1201, the CPU 201 functions as the user authentication service module 303, refers to the tables illustrated in FIG. 13A, FIG. 14A, and FIG. 14B stored in the HDD 204, and confirms whether or not the information associated with the card ID/Face ID of the logging-out user is stored. Here, if it is determined that there is no information (other than a role) associated with the card ID/Face ID of the logging-out user, the processing advances to step 1202. Meanwhile, if there is the information associated with the card ID/Face ID of the user, the processing will skip step S1202, advances to step S1203, and then executes logout processing of that user.

In step S1202, the CPU 201 functions as the user authentication service module 303 and deletes registration of the card ID/Face ID from the user information table of FIG. 13A. For example, assume that a user temporarily logged in by holding an unregistered card over the IC card reader 209 but logged out without using a function (such as copying, hold printing, and scan transmission) of the MFP 101. In such a case, a state is that in which only the card ID and the role are registered; accordingly, the processing in step S1202 is executed. Similarly, in a case where a user who logged in for the first time with the face authentication logs out without using a function (such as copying, hold printing, and scan transmission) of the MFP 101, a state is that in which the Face ID and the role are registered; accordingly, the processing in step S1202 is executed. For example, in the example of FIG. 13A, the information of the card ID/Face ID, "6fc11e17-faf4 . . . ", in the third row will be deleted. In a case of deleting the Face ID from the user information table of FIG. 13A, the user authentication service module 303 inputs the Face ID in the face authentication library module 306 and requests deregistration of the face information.

In the MFP 101 according to the embodiment, configuration is such that even unregistered users can log in; accordingly, there is no problem even if registration of the user is deleted at the time of logout. By there being the processing of this step S1202, there is an effect that accumulation in the user information table of registration of users with only a card ID/Face ID can be prevented. Note that in a case where there is information associated with the card ID/Face ID, registration deletion in step S1202 is not performed. Then, the processing advances to step S1203, and the CPU 201 functions as the user authentication service module 303, performs logout processing, and ends this processing. Specifically, login context information is deleted and completion of logout processing is notified to the local UI module 301.

Also, in a case where the check box of the automatic user deletion is checked and set as enabled in the user information deletion 404 of FIG. 4, the CPU 201 periodically refers to the latest login date of the user information table (FIG. 13A). Then, in a case where user information for which a period (in the example in FIG. 4, 30 days) set in the automatic user deletion has elapsed from the latest login date is found, the user information is deleted. Here, information associated with the card ID/Face ID of the user thereof is deleted from FIG. 13A and FIGS. 14A and 14B. In a case of deleting the Face ID from the user information table, the Face ID is further inputted in the face authentication library module 306 and deregistration of face information is requested.

As described above, according to the embodiment, login of a user and registration of a user are made possible even for unregistered user without burden on the administrator. Furthermore, by enabling setting of automatic user deletion, it is possible to delete user information that has become unnecessary without burden on the administrator. By this, it is possible to prevent unused user information from continuing to accumulate and waste the memory resource of the MFP.

Note that in the above-described embodiment, an example in which it is assumed that an email address is used as one's destination is given; however, the destination may be, for example, information indicating the location of a shared folder on the user's PC or a destination that uses another protocol.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), air Blu-ray Disc (BD)™), a flash memory device, a memory card, and the like.

For example, some of the functions of the user authentication service module 303 may be realized using an authentication server constituting of another node configured on the network. Also, configuration may be taken so as to perform network access to a database of another node configured on the network instead of the HDD.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-97834, filed Jun. 4, 2020, which is hereby incorporated by reference herein in its entirety.

What is claimed is:

1. An image forming apparatus, comprising:
a display;
a reader that reads an IC card; and
a controller including a processor and a memory, the controller being configured to:
perform settings for user authentication;
display, on the display, a menu screen for selecting a function of the image forming apparatus;
cause, in a case where in user authentication using the IC card and automatic registration of user information are set in the settings, when the reader detects the IC card, the image forming apparatus to log in a user of the IC card using information of the IC card; and
display, in a case where a user name of the user is registered, the user name on the menu screen, and display, in a case where the user name is not registered, an identifier of the IC card on the menu screen.

2. The image forming apparatus according to claim 1, wherein the controller being further configured to:
in a case where, in the settings, it is set to register user information of the user in a case of a first login of the user using the IC card, display on the display a screen for registering the user information of the user.

3. The image forming apparatus according to claim 1, wherein the controller being further configured to:
in a case where, in a state in which a user is logged in, a function that needs a user name of the user is selected from the menu screen and the user name is not registered, display, on the display, a screen for allowing the user to input the user name.

4. The image forming apparatus according to claim 3, wherein the controller being further configured to:
register user information of the user including the user name in association with the identifier of the IC card.

5. The image forming apparatus according to claim 1, wherein the controller being further configured to:
in a case that, in a state in which the user is logged in, a function of the image forming apparatus is selected and executed, store history information of the function in association with setting information of the function and the identifier of the IC card.

6. The image forming apparatus according to claim 5, wherein
the history information is held even after the user logs out, and the controller being further configured to:
display, when the user logs in with the identifier of the IC card, a button that enables use of history information corresponding to the user on the menu screen.

7. The image forming apparatus according to claim 1, wherein the controller being further configured to:
in a case where, in a case that the user logs out, there is no user information associated with the identifier of the IC card of the user, delete the identifier of the IC card of the user.

8. The image forming apparatus according to claim 1, wherein the controller being further configured to:
be able to further set, in the settings, whether or not to automatically delete user information of a logged-in user and a time period, and automatically delete, in a case where the settings is enabled, the user information of the user for which the time period has elapsed from a date on which the user last logged in.

9. A method of controlling an image forming apparatus, the method comprising:

performing settings for user authentication;

displaying, on a display, a menu screen for selecting a function of the image forming apparatus;

reading an IC card;

causing, in a case where, in the settings, user authentication by the IC card and automatic registration of user information are set and when the reader detects the IC card, the image forming apparatus to log in a user of the IC card using information of the IC cards;

displaying, in a case where a user name of the user is registered, the user name on the menu screen; and displaying, in a case where the user name is not registered, an identifier of the IC card on the menu screen.

10. A non-transitory computer-readable storage medium storing a program for causing a processor to execute a method of controlling an image forming apparatus, the method comprising:

performing settings for user authentication;

displaying, on a display, a menu screen for selecting a function of the image forming apparatus;

reading an IC card;

causing, in a case where, in the settings, user authentication by the IC card and automatic registration of user information are set and when the reader detects the IC card, the image forming apparatus to log in a user of the IC card using information of the IC card;

displaying, in a case where a user name of the user is registered, the user name on the menu screen; and displaying, in a case where the user name is not registered, an identifier of the IC card on the menu screen.

* * * * *